United States Patent Office.

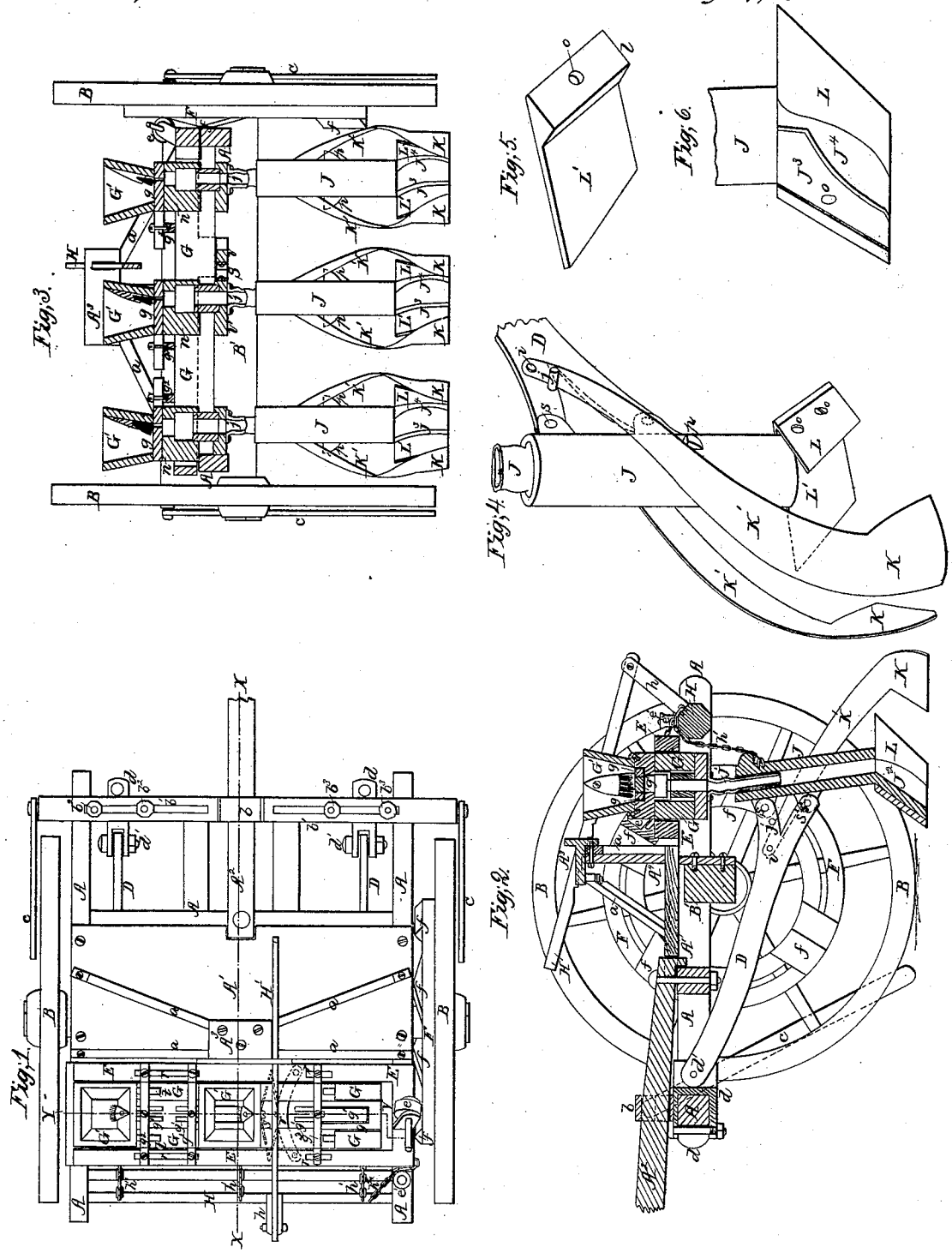

JOHN H. STRINGFELLOW, OF RICHMOND, VIRGINIA.

Letters Patent No. 89,606, dated May 4, 1869.

IMPROVEMENT IN SEEDING-MACHINES.

The Schedule referred to in these Letters Patent and making part of the same.

*To all whom it may concern:*

Be it known that I, JOHN H. STRINGFELLOW, of Richmond, in the county of Henrico, and State of Virginia, have invented a new and improved Seeder and Cultivator combined; and I do hereby declare that the following is a full, clear, and exact description thereof, reference being had to the accompanying drawings, making part of this specification, in which—

Figure 1, sheet 1, is a plan view of the improved machine complete.

Figure 2, sheet 1, is a longitudinal section, taken centrally through the machine in the vertical plane indicated by red line $xx$ in fig. 1.

Figure 3, sheet 2, is a section taken transversely through the seed-hoppers, in the vertical plane indicated by red line $yy$ in fig. 1.

Figure 4, sheet 2, is a perspective view of one of the drill-teeth, and covering-attachments.

Figure 5, sheet 2, is a view of the lower end of one tooth, with one of the wings of the drill-opener detached to form a plow or hoe.

Figure 6, sheet 2, is a perspective view of one of the removable wings of a drill-tooth.

Similar letters of reference indicate corresponding parts in the several figures.

This invention relates to certain novel improvements on wheel-machines, which are designed for planting corn, or other seeds in hills or drills, at regular intervals apart, and which are convertible into cultivators for loosening the earth between rows of young plants.

The nature of my invention consists—

First, in sustaining the driver's seat of a seeder or cultivator upon the axle of two transporting-wheels, by means of an arched frame, and a central support, constructed over a platform in such manner as to brace and strengthen the axle, as well as to afford an elevated position to the driver, as will be hereinafter explained.

Secondly, in a rectilinear-reciprocating seed-distributing sash, provided with adjustable seed-slides, operated conjointly, by a series of rotating cams and a spring, and connected by a chain or belt to an oscillating shaft, from which the drill-teeth are suspended in such manner, that the motion of the sash and the distribution of the seed can be made to cease at the same time the drill-teeth are raised from the ground, by the adjustment of a rod, which is under control of the driver while sitting on his seat, as will be hereinafter explained.

Thirdly, in combining with laterally-adjustable hoppers and seed-slides, laterally-adjustable drill-teeth and markers, in the manner hereinafter described, whereby the machine can be quickly adapted for planting seed in drills at different distances apart, and at regular distances apart, as will be hereinafter explained.

Fourthly, in constructing each drill-tooth with one permanently-attached share-blade, also with one side adapted to serve as a landside for the permanently-attached share, when the other share is removed, thereby enabling me to convert the machine into a good cultivator for hilling up and working young plants, as will be hereinafter explained.

Fifthly, in constructing the tube of each drill-tooth with side lugs, adapted for preventing the hinged or pivoted coverers from dropping too far, and in the employment, in conjunction therewith, of fragile stops, applied to the drag-bars, above the arms of said covers, for the purpose of keeping the latter down in working-position, as will be hereinafter explained.

To enable others skilled in the art to understand my invention, I will describe its construction and operation.

In the accompanying drawings—

A represents a rectangular frame, consisting of longitudinal and transverse beams, firmly secured together; and B' represents the axle of two transporting-wheels B B, upon which axle the frame A is firmly secured, so as to extend both forward and backward thereof, as shown in figs. 1 and 2.

$A^1$ represents a platform, which is secured upon the frame A, beneath an elevated driver's seat, $A^3$, and just in rear of the central draught-tongue $A^2$.

The driver's seat $A^3$ is mounted upon a standard, $A^4$, which rises perpendicularly from the back of axle B', to which the standard is secured.

To the bottom of the seat $A^3$, on each side of the standard $A^4$, two braces $a\ a$ are firmly secured, which are carried out laterally inclined, as shown in the drawings, and secured to the frame or platform of the carriage.

Two of the braces $a\ a$ on opposite sides of the standard $A^4$, are bolted to the platform.

It will thus be seen that the seat is sustained upon the axle B' by means of vertical and arched, or inclined braces, which will greatly strengthen the axle, and also afford the driver an elevated position above the platform A.

To the front transverse beam of the frame A, three clamps $d\ d\ d$ are secured at proper distances apart, to which are pivoted the drag-bars D, which carry the drill-teeth.

The central clamp $d$ may be permanently secured to its cross-bar of frame A, but the two side clamps should be so applied, that they can be adjusted laterally, and set at any required distance from the central clamp.

By thus providing for adjusting the pivotal attachments of the front ends of the drag-bars D, it is obvious that these bars can be set for making drills at different distances apart; also, when the teeth are adapted for cultivating plants, they can be adjusted to work to the best advantage.

The teeth J are suspended by means of chains $h^1$, from a horizontal transverse rolling-bar, H, which has its end bearings in the rear ends of frame A, which bar H has an arm, $h$, fixed to it, to the free end of which a rod, H', is pivoted. This rod extends forward, and is passed through a vertical slot, made through the back of seat $A^3$, and by means of notches made in the bottom edge of rod H', it can be held in any desired position when pressed backward.

By pressing rod H' backward, the bar H will turn about its axis, and wind up the chains $h^1$, thus elevating the drill-teeth above the ground, and in this condition the parts can be held, by engaging one of the teeth on rod H' with the seat-back.

To allow the drill-teeth to drop into operation again, it is only necessary to move rod H' forward.

The drill-teeth J, which are tubular, communicate with their respective seed-hoppers G', through flexible tubes $J^1$, which allow said teeth to rise and descend without breaking the communications.

Each one of the tubular drill-teeth J is constructed with two perforated ears upon its front edge, to which ears the forked end of the drag-bar D is connected, by pins s s, the lower one of which may be of wood, so as to break and allow the lower end of the tooth to swing back, should such end meet with an obstruction that would be liable to break or derange the machine.

The lower end of each tooth has a bevelled wing, $J^3$, formed on one side, as shown in figs. 3 and 5.

To the bevelled wing $J^4$, a share, or blade, L, is permanently secured, and to the vertical surface $J^3$, a blade, or share, L', is secured by one or more bolts, so that it can be removed at pleasure.

The blade, or share L' is constructed with an angle, l, on its inner side, which, when this share is applied to the plane face $J^3$, will give it the same angle and inclination as the share L, thus forming a double-share or mould-board plow, or drill-tooth.

When the share L' with its angle or bevelled front edge, l, is removed from the tooth J, it leaves the plane face $J^3$ to serve as the landside for the share, or mould-board L, during the operation of plowing or cultivating young plants.

For each drill-tooth, I use two coverers K K, shaped substantially as represented in figs. 2, 3, and 4, and formed on the rear ends of curved arms K' K'.

These arms K' are connected at their front ends to their drag-bar D, by means of a transverse pivot, i, and they extend backward beneath pins j, and over lugs p p, which latter are cast, or otherwise formed on the sides of the said tooth J, as shown in figs. 3 and 4.

The coverers gather in the earth spread out by their respective plows, or drills, and cover the seed dropped through the teeth.

The seeds to be dropped, are put into hoppers G', which are secured rigidly to parallel transverse beams G of frame A, arranged in rear of the axle B' as shown in figs. 1, 2, and 3.

The bottoms n of the hoppers are perforated vertically, and slotted transversely.

The bottom n of the intermediate hopper G' may be permanently secured to the beams G G, but bottoms n n of the side hoppers should be made laterally adjustable, to correspond to the lateral adjustments given to the clamps d and drill-teeth.

For the purpose of allowing the side hoppers G' to be adjusted and set at any required distance apart, they are separately secured to their beams G G, by bolts passed vertically through oblong slots t t, so that by loosening these bolts, said hoppers can be moved nearer to or further from the central hopper.

Outside of the transverse beams G G, and guided thereby, is a reciprocating sash, E, carrying on one end a roller, e, which is acted upon by cams f, on a ring, F, of one of the carriage-wheels B.

The cams f move the sash in one direction, and a spring moves it back.

The cams f are double-bevel pieces, arranged concentrically around the axis of their wheel B, and secured at required distances apart to the circularly-slotted ring F, by means of bolts, so that any one or more of the cams can be removed at pleasure, and so that these cams can be adjusted at regular distances apart.

The spring S which presses the collar e on sash E, against the inner face of the ring F and cams f, is arranged beneath the beams G G, and confined between the curved faces of blocks v v', one of which blocks v', is secured to the beams G G, and the other, v, to the bottom of the sash E.

The spring S is of the elliptic kind, which will be less liable to become injured or clogged than any other kind of spring.

Just in rear of the roller e, and applied on one of the longitudinal beams of frame A, is a roller, e', around which passes a chain, $h^2$, that is attached at one end to the sash E, and at the other end to the roller-bar H, as shown in fig. 1; thus when this roller H is turned backward by a backward thrust of the rod H' for raising the plows, or drill-teeth free from the ground, the chain $h^2$ will move the roller e on sash E, away from the cams f far enough to prevent this sash from receiving motion.

The seed-slides g and their adjustable slides $g^1$, are secured to bridges $g^2$, which are secured to the sash E, by means of bolts that pass vertically through oblong holes r r, made through this sash, which allow the bridges and their slides to be adjusted according to the number of grains which it may be desired to drop at any one time.

For the purpose of regularly spacing the rows or hills during the operation of planting or drilling, I employ drag-rods c c, which are pivoted at their front ends to laterally-adjustable bearings b', secured upon the front cross-beam of frame A, by means of bolts that pass through oblong slots made through said bearings.

These drag-bars c serve as gauges, and allow the attendant of the machine to guide the same in lines parallel to antecedent drills or hills, and to run all the drills or hills at regular distances apart.

Having described my invention,

What I claim as new, and desire to secure by Letters Patent, is—

1. The seed-distributing sash E, adjustable bridges $g^2$, seed-slides $g\ g^1$, roller e, adjustable cams f, spring S, rolling-bar H, and connecting-device $h^2$, combined substantially as and for the purpose described.

2. The combination of the rolling-bar H, arm h, rod H', suspension-attachment $h^1$, drill-teeth J, sliding sash E, and connecting-device $h^2$, substantially as and for the purpose described.

3. The combination of the laterally-adjustable drag-bars D, the laterally-adjustable hoppers G', and the laterally-reciprocating seed-distributing sash E, all substantially in the manner and for the purpose described.

4. The combination of the sash E, spring S, fixed block v', and movable block v, all arranged and operated substantially in the manner described.

5. The lugs p on the drill-tubes J, pins j on the drag-bars, in combination with the pivoted coverers K K', all arranged and operating as described.

6. The arrangement of the oblique and inclined supports a a, upright $A^4$ of the axle-tree B', and the seat $A^3$, all in the manner and for the purpose described.

7. The tubular drill-tooth J, constructed with the wing $J^4$, and vertical plane face $J^3$, in combination with the blades L and L', substantially as and for the purpose described.

Witness my hand in matter of my application for a patent for improvement in seeding-machines.

JOHN H. STRINGFELLOW.

Witnesses:
JULIUS HIRSCH,
J. N. CAMPBELL.